US009541099B2

(12) United States Patent
Pekarsky et al.

(10) Patent No.: US 9,541,099 B2
(45) Date of Patent: Jan. 10, 2017

(54) SELF REPLENISHING ACCUMULATOR

(71) Applicant: FORD GLOBAL TECHNOLOGIES, LLC, Dearborn, MI (US)

(72) Inventors: Lev Pekarsky, West Bloomfield, MI (US); Robert O. Burkhart, Novi, MI (US); Mark Davis, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 302 days.

(21) Appl. No.: 14/219,064

(22) Filed: Mar. 19, 2014

(65) Prior Publication Data

US 2014/0311577 A1 Oct. 23, 2014

Related U.S. Application Data

(60) Provisional application No. 61/812,778, filed on Apr. 17, 2013.

(51) Int. Cl.

*F16L 55/04* (2006.01)
*F15B 1/24* (2006.01)
*F15B 1/08* (2006.01)

(52) U.S. Cl.

CPC . *F15B 1/24* (2013.01); *F15B 1/08* (2013.01); *F15B 2201/205* (2013.01); *F15B 2201/31* (2013.01); *F15B 2201/4155* (2013.01); *Y10T 137/0318* (2015.04)

(58) Field of Classification Search

CPC ........................................................ F15B 1/24
USPC ..................................................... 138/30, 31
See application file for complete search history.

(56) References Cited

U.S. PATENT DOCUMENTS 2,605,716 A * 8/1952 Huber ..................... F15B 1/027 137/204
2,683,467 A * 7/1954 Greer ........................ F15B 1/24 138/31
2,748,801 A * 6/1956 McCuistion .............. F15B 1/24 138/31
2,891,564 A * 6/1959 Jeromson, Jr. .......... F15B 1/027 138/31
3,230,977 A * 1/1966 Mercier .................... F15B 1/24 138/31
6,460,571 B1 * 10/2002 Rajabi ................... F16L 55/053 138/109
6,923,215 B2 * 8/2005 Weber ....................... F15B 1/24 138/31

* cited by examiner

*Primary Examiner* — Paul R Durand
*Assistant Examiner* — Vishal Pancholi
(74) *Attorney, Agent, or Firm* — James Dottavio; MacMillan, Sobanski & Todd, LLC

(57) ABSTRACT

An accumulator includes a cylinder for containing a working fluid and a first volume of pressurized gas, the gas and fluid being separated by a displaceable piston and a first seal contacting the piston and the cylinder, a reservoir carried on the piston for containing a second volume of pressurized gas, and a device that permits gas flow from the second volume into the first volume.

18 Claims, 3 Drawing Sheets

SELF REPLENISHING ACCUMULATOR

CROSS REFERENCE TO RELATED APPLICATIONS

This patent application claims priority to and the benefit of U.S. provisional application No. 61/812,778, filed Apr. 17, 2013, the full disclosure of which is incorporated herein by reference.

BACKGROUND OF INVENTION

This invention relates generally to an accumulator that holds a pressurized hydraulic working fluid and automatically replenishes a volume of gas that keeps the accumulator charged.

Fuel economy of a vehicle can be increased by a stop-start system that automatically stops an internal combustion engine when the vehicle is stopped and restarts the engine when an operator indicates intent to accelerate the vehicle. A vehicle equipped with an automatic transmission and the stop-start system requires that automatic transmission fluid be maintained pressurized while the engine is stopped. An engine driven hydraulic pump that normally pressurizes the automatic transmission fluid while the engine is running is incapable of maintaining the fluid pressurized while the engine is stopped. An accumulator containing pressurized transmission fluid is continually connected to the hydraulic system of the transmission so that hydraulic system pressure is maintained until the engine restarts. The accumulator uses a gas pre-charge to maintain the pressure of the transmission fluid.

However, slow leakage through and around a piston seal in the accumulator depletes the gas pre-charge over the life of a gas-charged accumulator. This changes the amount of working fluid that the accumulator holds and eventually lowers the peak working pressure of the accumulator when the piston reaches a stroke limit.

SUMMARY OF INVENTION

An accumulator includes a cylinder containing a working fluid and a first volume of pressurized gas, the gas and fluid being separated by a displaceable piston and a first seal sealing between the piston and the cylinder, a reservoir carried on the piston containing a second volume of pressurized gas, and a device that permits gas flow from the second volume into the first volume.

The accumulator provides a solution to permeation and sliding seal gas loss by automatically replenishing pressure and a volume of gas that keeps the accumulator charged.

The accumulator contains the high pressure replenishment reservoir within its piston, making manufacturing and assembly easier.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
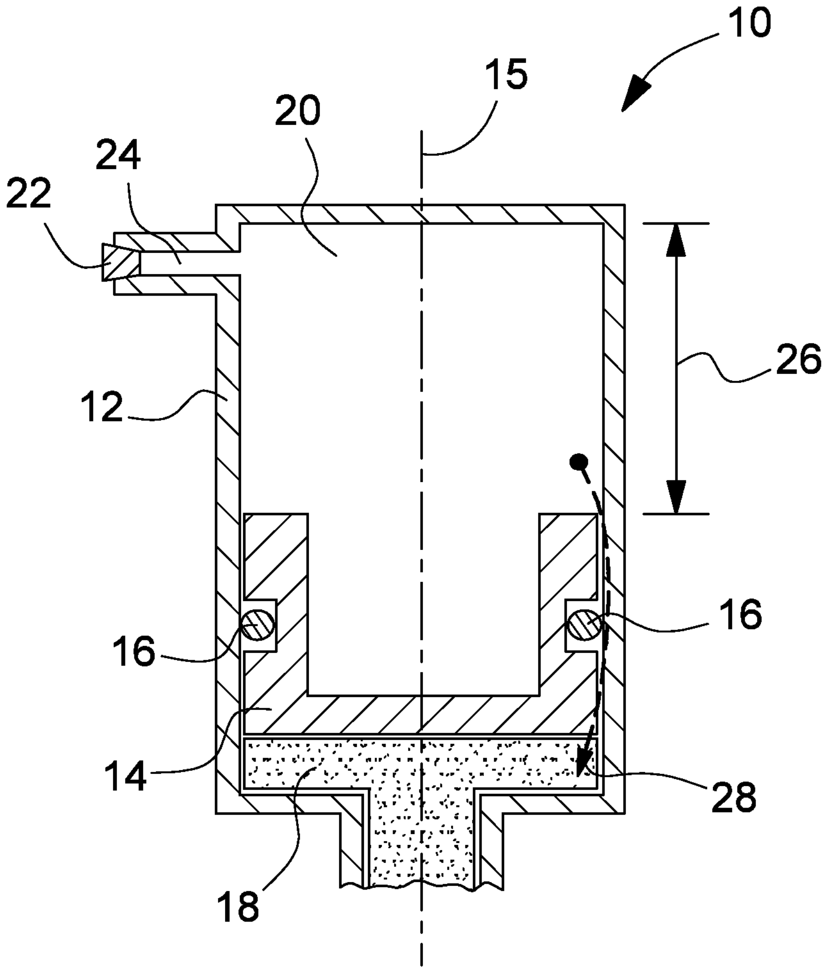
Fig. 1 (Prior Art)
FIG. 1 is a schematic cross section at a diametric plane of a hydraulic fluid accumulator according to the prior art.

Referring now to FIG. 1, there is illustrated a prior art accumulator 10 including a cylinder 12; a piston 14, displaceable along an axis 15 of the cylinder 12; an O-ring seal 16 located between a radial outer surface of the piston 14 and an inner surface of the cylinder 12; a working fluid 18 located below the piston 14, which may be an automatic transmission fluid; and a gas pressure chamber 20 in the cylinder 12, above the piston 14, containing a pressurized pre-charge gas and sealed by a plug 22 in a passage 24. As a level of the working fluid 18 in the cylinder 12 changes, the piston 14 strokes along a length 26. Slow leakage of the pre-charge gas through and around the seal 16 (flow illustrated by arrow 28) depletes the pressurized pre-charge gas over a service life of the accumulator 10.

Figure 2:
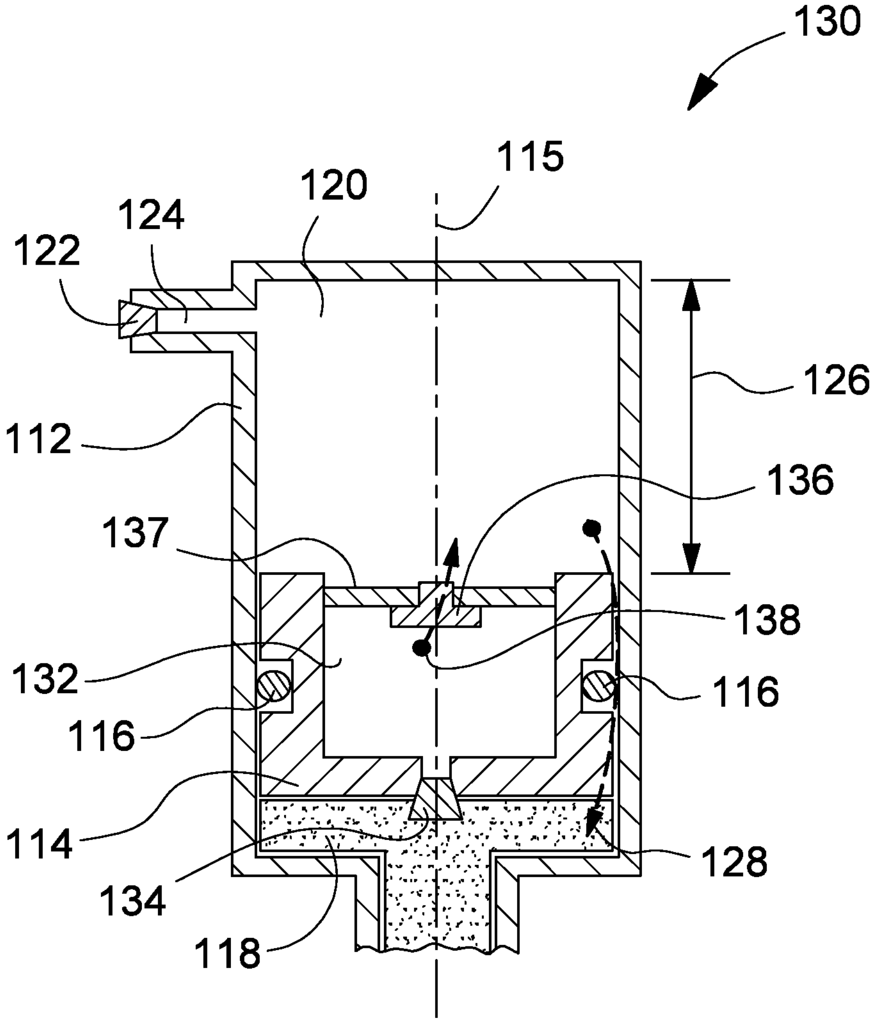
FIG. 2 is a schematic cross section at a diametric plane of a hydraulic fluid accumulator containing a permeable plug.

FIG. 2 illustrates an accumulator 130 including a cylinder 112; a piston 114, displaceable along an axis 115 of the cylinder 112; an O-ring seal 116 located between a radial outer surface of the piston 114 and an inner surface of the cylinder 112; a working fluid 118 located below the piston 114, which may be an automatic transmission fluid; and a gas pressure chamber 120 in the cylinder 112, above the piston 114, containing a pressurized pre-charge gas and sealed by a plug 122 in a passage 124. As a level of the working fluid 118 in the cylinder 112 changes, the piston 114 strokes along a length 126.

The accumulator 130 includes a high pressure reservoir 132, fitted in the piston 114, containing a re-charge gas under pressure greater than the pre-charge gas in the chamber 120. The pre-charge and re-charge gases may both be the same gas. For example, the pre-charge and recharge gases may both be nitrogen. Alternatively, different gases may be used for the pre-charge and re-charge gases. A lower end of reservoir 132 is closed by a plug 134 in a passage through the piston 114. The reservoir 132 fluidly communicates with the chamber 120 through a permeable seal 136 extending through an upper cell 137. The permeable seal 136 is configured to allow the re-charge gas in the reservoir 132 to flow into the chamber 120 (flow illustrated by arrow 138) slightly more slowly than the pre-charge gas leaks from the chamber 120, between a seal 116 and inner surface of a cylinder 112, into a working fluid 118 (flow illustrated by arrow 128). The permeable seal 136 may be fabricated from the same material as the seal 116. For example, the permeable seal 136 may be fabricated from an elastomeric material.

In this way, the high pressure reservoir 132 contained in the piston 114 replenishes the pre-charge gas in the chamber 120 with the re-charge gas through the seal 136. The cross sectional area of the seal 136 may be scaled with the pressure differential between the chamber 120 and reservoir 132 such that the re-charge gas from the reservoir 132 enters the chamber 120 slightly more slowly than the pre-charge gas from the chamber 120 leaks into the fluid 118.

Figure 3:
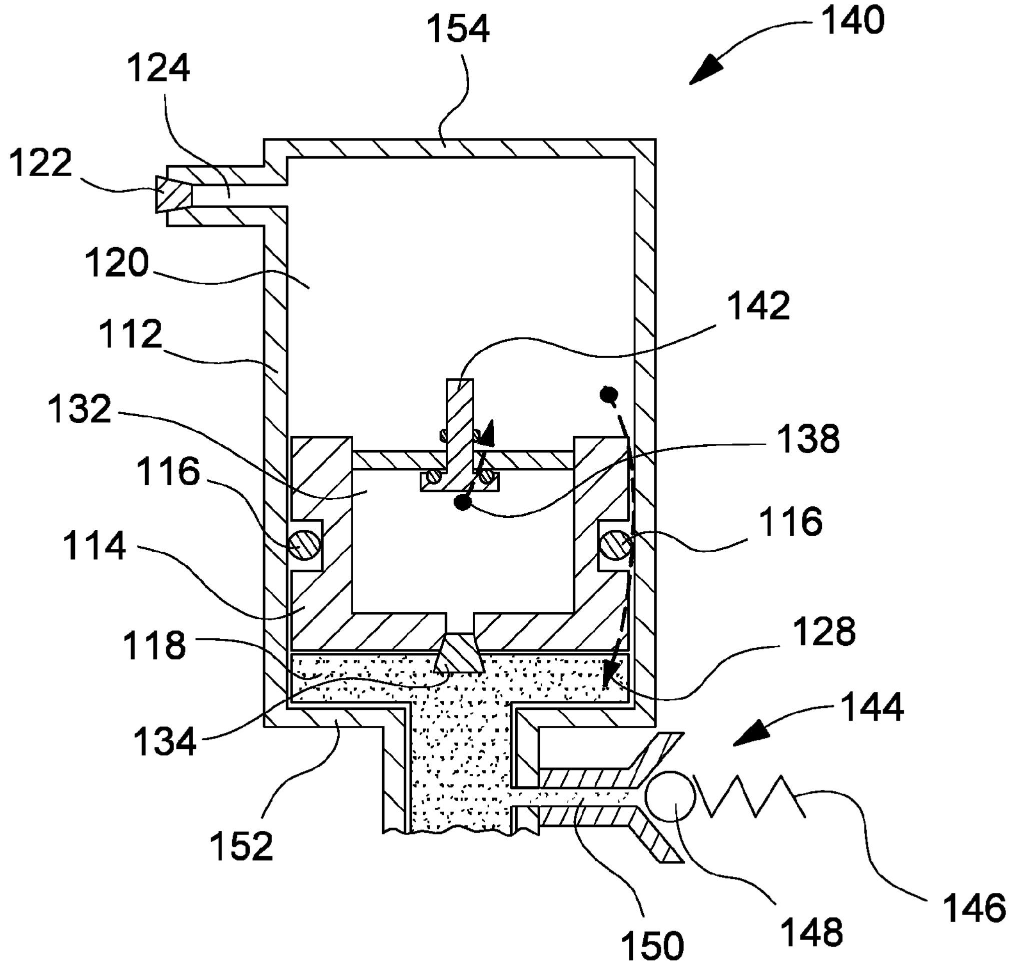
FIG. 3 is a schematic cross section at a diametric plane of a hydraulic fluid accumulator having a position sensing valve.

FIG. 3 illustrates an accumulator 140. Because the accumulator 140 is similar to the accumulator 130 of FIG. 2, like reference numerals designate corresponding elements in the drawings.

The accumulator 140 of FIG. 3 includes a reservoir 132, fitted in a piston 114, containing a re-charge gas under pressure greater than a pre-charge gas in a chamber 120. A lower end of reservoir 132 is closed by a plug 134 in a passage through the piston. The reservoir 132 fluidly communicates with the chamber 120 through a valve 142 whose operating state varies between open and closed depending on a stroke position of the piston 114.

When the stroke position of the piston 114 is low, i.e., the piston 114 is located at or near a bottom 152 of a cylinder 112, the valve 142 is closed due to a magnitude of upward force on the valve 142, produced by pressure of the re-charge gas in the reservoir 132, exceeding a magnitude of downward force on the valve 142, produced by pressure of the pre-charge gas in the chamber 120.

The valve 142 opens when the stroke position of the piston 114 is large, i.e., the piston 114 moves upward towards a top 154 of the cylinder 112 due to loss of pre-charge gas pressure in the chamber 120 and pressure of a working fluid 118. When the piston 114 strokes near the top 154, the valve 142 is opened by the top 154 displacing the valve 142 towards the reservoir 132. When the valve 142 is open, high pressure re-charge gas in the reservoir 132 replenishes the pre-charge gas in the chamber 120 by flowing through the valve 142. The valve 142 may include a spring to ensure that the valve 142 reseats as increasing pressure in the chamber 120 forces the piston 114 downward towards the bottom 152.

A relief valve 144, which may be a one-way ball valve, opens when pressure of the working fluid 118 exceeds a reference pressure of the valve 144 as determined by force of a compression spring 146 acting on a ball 148. The relief valve 144 responds to pressure of the working fluid 118 to seat or unseat the ball 148 on an opening at an end of a passage 150, thereby closing or opening, respectively, the valve 144.

While certain embodiments of the present invention have been described in detail, those familiar with the art to which this invention relates will recognize various alternative designs and embodiments for practicing the invention as defined by the following claims.

The invention claimed is:

1. An accumulator comprising:

a cylinder containing a working fluid and first volume of pressurized gas separated by a displaceable piston, and a first seal between the piston and the cylinder;

a reservoir carried on the piston containing a second volume of pressurized gas, and a sealed opening between the second volume and working fluid for pressurizing the second volume;

a device that permits gas flow from the second volume into the first volume.

2. The accumulator of claim 1, wherein the device comprises an upper cell fixed to the piston and extending normal to a direction of displacement of the piston, and an elastomeric second seal extending through a hole through the upper cell carried on the piston and permeable to gas flow from the second volume into the first volume via elastomeric flexing of the second seal.

3. The accumulator of claim 2, wherein a cross sectional area of the second seal is scaled such that gas flow from the second volume into the first volume is slightly slower than gas flow out of the first volume into the working fluid.

4. The accumulator of claim 2, wherein a cross sectional area of the second seal is scaled to a pressure differential between the first and second volumes.

5. The accumulator of claim 2, wherein permeability of a material used for the second seal is scaled such that gas flow from the second volume into the first volume is slightly slower than gas flow out of the first volume.

6. The accumulator of claim 2, wherein permeability of a material used for the second seal is scaled to a pressure differential between the first and second volumes.

7. The accumulator of claim 1, wherein the device comprises an upper cell fixed to the piston and extending normal to a direction of displacement of the piston, and a valve extending through a hole through the upper cell that moves axially relative to the upper cell to open communication between the first and second volumes when pressure in the first volume exceeds pressure in the second volume, and closes communication between the first and second volumes when pressure in the second volume exceeds pressure in the first volume.

8. The accumulator of claim 7, further comprising a second valve that relieves pressure of the working fluid when pressure of the working fluid exceeds a reference pressure.

9. The accumulator of claim 1 wherein the working fluid is an automatic transmission fluid.

10. The accumulator of claim 1 wherein the piston is housed within the cylinder.

11. The accumulator of claim 2 wherein the second seal is on an axially opposite end of the piston from the sealed opening.

12. The accumulator of claim 1 wherein the device comprises a valve slidable axially relative to the piston to selectively seal and open communication between the first and second volumes.

13. The accumulator of claim 1 wherein the device comprises a valve slidable axially relative to the piston to open communication between the first and second volumes when the piston compresses the gas such that the valve contacts an axial end wall of the cylinder.

14. An accumulator comprising:

a cylinder containing a working fluid and first volume of pressurized gas separated by a displaceable piston, and a first seal between the piston and the cylinder;

a reservoir carried on the piston containing a second volume of pressurized gas;

an upper cell fixed to the piston separating the first and second volumes, having an axially extending hole;

a device extending through the hole, selectively permitting gas flow therethrough, wherein the device comprises a valve slidable axially relative to the piston to selectively seal and open communication between the first and second volumes.

15. The accumulator of claim 14 wherein the piston includes a sealed opening between the second volume and working fluid for pressurizing the second volume.

16. The accumulator of claim 15 wherein the device is an elastomeric second seal, which is on an axially opposite end of the piston from the sealed opening.

17. The accumulator of claim 14 wherein the device comprises an upper cell fixed to the piston and extending normal to a direction of displacement of the piston, and an elastomeric second seal extending through a hole through the upper cell carried on the piston and permeable to gas flow from the second volume into the first volume via elastomeric flexing of the second seal.

18. The accumulator of claim 14 wherein the device comprises a valve slidable axially relative to the piston to open communication between the first and second volumes when the piston compresses the gas such that the valve contacts an axial end wall of the cylinder.

* * * * *